(12) United States Patent
Woiki et al.

(10) Patent No.: US 11,703,419 B2
(45) Date of Patent: Jul. 18, 2023

(54) CONDENSATE DISCHARGING SYSTEM FOR AN EXHAUST-GAS MEASURING DEVICE

(71) Applicant: AVL EMISSION TEST SYSTEMS GMBH, Neuss (DE)

(72) Inventors: Dirk Woiki, Duesseldorf (DE); Torsten Bornemann, Willich (DE)

(73) Assignee: AVL EMISSION TEST SYSTEMS GMBH, Neuss (DE)

(*) Notice: Subject to any disclaimer, the term of this patent is extended or adjusted under 35 U.S.C. 154(b) by 1091 days.

(21) Appl. No.: 16/346,878

(22) PCT Filed: Nov. 3, 2017

(86) PCT No.: PCT/EP2017/078168
§ 371 (c)(1),
(2) Date: May 2, 2019

(87) PCT Pub. No.: WO2018/087003
PCT Pub. Date: May 17, 2018

(65) Prior Publication Data
US 2019/0310165 A1 Oct. 10, 2019

(30) Foreign Application Priority Data
Nov. 9, 2016 (DE) ............. 10 2016 121 441.8

(51) Int. Cl.
*G01M 15/10* (2006.01)
*F01N 3/00* (2006.01)
(Continued)

(52) U.S. Cl.
CPC .......... *G01M 15/102* (2013.01); *F01N 3/005* (2013.01); *F01N 11/00* (2013.01); *F16T 1/20* (2013.01);
(Continued)

(58) Field of Classification Search
CPC ...... G01M 15/102; F01N 3/005; F01N 11/00; F01N 2240/22; F01N 2560/02; F16T 1/20; F16T 1/45; Y02T 10/12
See application file for complete search history.

(56) References Cited

U.S. PATENT DOCUMENTS 3,348,564 A 10/1967 Söchting et al.
4,685,486 A 8/1987 Yokoyama
(Continued)

FOREIGN PATENT DOCUMENTS

AT     A 210590 A    8/1995
CN   101086221 A   12/2007
(Continued)

OTHER PUBLICATIONS

Machine translation of DE 102006020292 (Year: 2007).*
(Continued)

*Primary Examiner* — Patrick C Williams
(74) *Attorney, Agent, or Firm* — Norman B. Thot

(57) ABSTRACT

A condensate discharge system for an exhaust gas measuring device. The condensate discharge system includes a condensate separator in which a positive pressure prevails, an outflow line in which atmospheric pressure prevails, a connecting line, and an intermediate reservoir in which the positive pressure prevails. The intermediate reservoir is arranged between the condensate separator and the outflow line and is directly connected to the condensate separator via the connecting line. The intermediate reservoir includes a float valve via which a condensate is dischargeable into the outflow line.

13 Claims, 1 Drawing Sheet

(51) Int. Cl.
*F01N 11/00* (2006.01)
*F16T 1/20* (2006.01)
*F16T 1/45* (2006.01)

(52) U.S. Cl.
CPC ............ *F16T 1/45* (2013.01); *F01N 2240/22* (2013.01); *F01N 2560/02* (2013.01); *F01N 2560/12* (2013.01)

(56) References Cited

U.S. PATENT DOCUMENTS

| | | | |
|---|---|---|---|
| 9,334,109 | B1 | 5/2016 | Mueller et al. |
| 2003/0155007 | A1 | 8/2003 | Hotta et al. |
| 2004/0103727 | A1 | 6/2004 | Erlach et al. |
| 2009/0031996 | A1* | 2/2009 | Chung .................. F02M 31/20 123/518 |
| 2009/0293461 | A1 | 12/2009 | Miyagawa et al. |
| 2012/0312075 | A1 | 12/2012 | Schimpl et al. |
| 2013/0318948 | A1 | 12/2013 | Van Marion |
| 2016/0033384 | A1 | 2/2016 | Bergmann et al. |

FOREIGN PATENT DOCUMENTS

| | | |
|---|---|---|
| CN | 101356347 A | 1/2009 |
| CN | 101683589 A | 3/2010 |
| CN | 102735799 A | 10/2012 |
| CN | 103380282 A | 10/2013 |
| DE | 37 06 941 A1 | 9/1988 |
| DE | 41 34 230 A1 | 4/1992 |
| DE | 43 03 514 A1 | 8/1994 |
| DE | 10 2004 060 352 B3 | 5/2006 |
| DE | 10 2006 020 292 A1 | 10/2007 |
| DE | 10 2008 045 479 A1 | 3/2010 |
| DE | 10 2010 038 331 A1 | 1/2012 |
| DE | 10 2015 200 053 A1 | 7/2015 |
| EP | 1 600 685 A1 | 11/2005 |
| EP | 2 557 348 A1 | 2/2013 |
| EP | 2 910 867 A1 | 8/2015 |
| FR | 2 936 023 A1 | 3/2010 |
| GB | 2 159 927 A | 12/1985 |
| JP | S 49-044154 | 12/1974 |
| JP | H10-184471 A | 7/1998 |
| JP | H 10-185778 A | 7/1998 |
| JP | H 11-337458 A | 12/1999 |
| JP | 2001-4503 A | 1/2001 |
| JP | 2011-137646 A | 7/2011 |
| JP | 2012-145524 A | 8/2012 |
| KR | 10-2005-0068985 A | 7/2005 |
| KR | 10-2013-0018570 A | 2/2013 |
| WO | WO 2012/010281 A1 | 1/2012 |
| WO | WO 2013/034393 A1 | 3/2013 |

OTHER PUBLICATIONS

Machine translation of JPH11337458. (Year: 1992).*
Disclosed Anonymously: "System and Method for Minimizing Nitrous Oxide Emissions", IP-COM, pp. 1-8 (2012).
L. Jianchun et al.: "Study on the Gas Constant volume sample System (CFV-CVS) for Automobile Emissions Measurement", Fahrzeuge und Energietechnik, vol. 2, pp. 29-36 (1996), English Abstract.

* cited by examiner

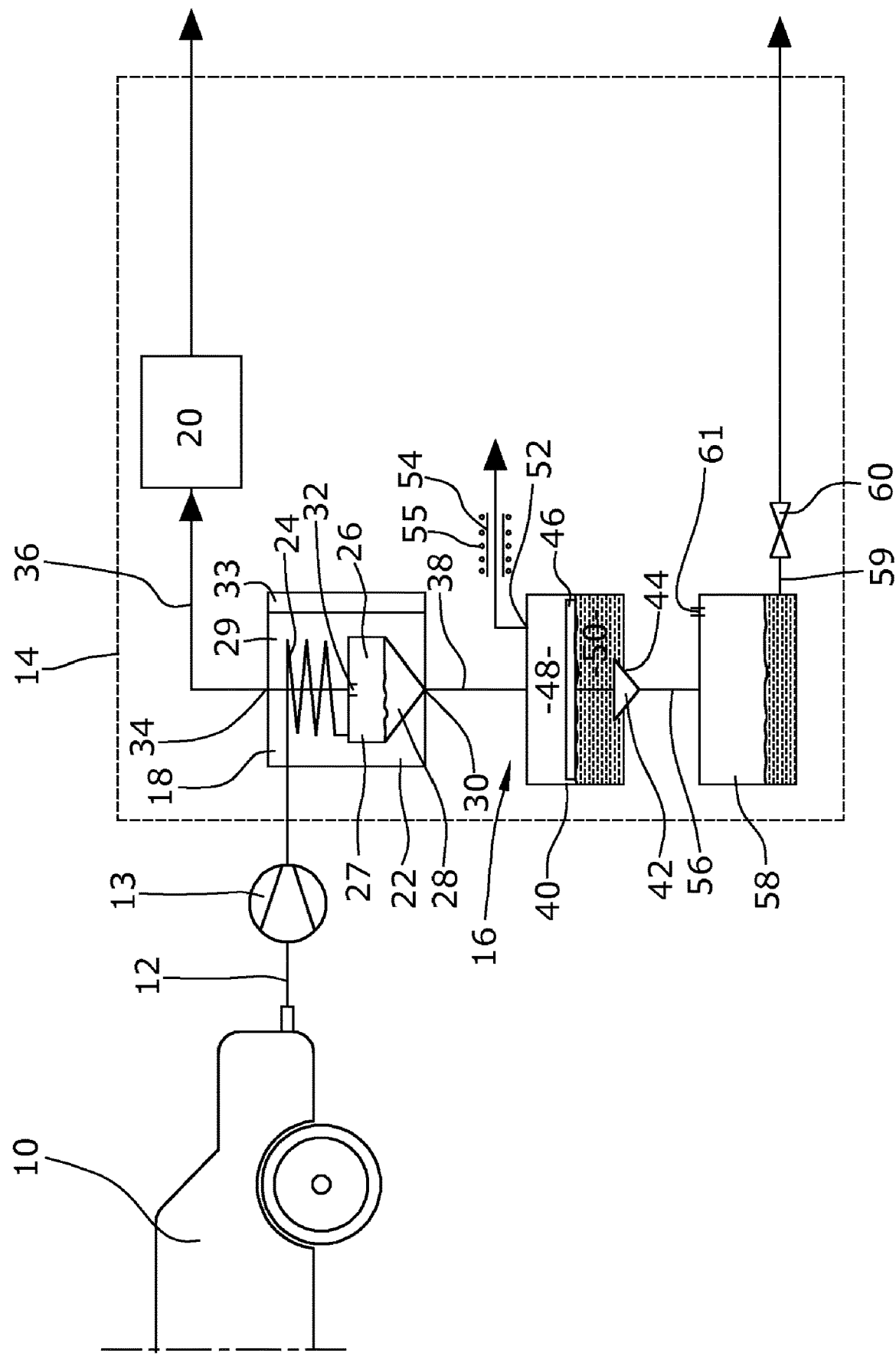

CONDENSATE DISCHARGING SYSTEM FOR AN EXHAUST-GAS MEASURING DEVICE

CROSS REFERENCE TO PRIOR APPLICATIONS

This application is a U.S. National Phase application under 35 U.S.C. § 371 of International Application No. PCT/EP2017/078168, filed on Nov. 3, 2017 and which claims benefit to German Patent Application No. 10 2016 121 441.8, filed on Nov. 9, 2016. The International Application was published in German on May 17, 2018 as WO 2018/087003 A1 under PCT Article 21(2).

FIELD

The present invention relates to a condensate discharge system for an exhaust gas measuring device comprising a condensate separator and an outflow line in which atmospheric pressure prevails.

BACKGROUND

Such condensate discharge systems, which are known from numerous applications, are used to separate water from fluids, in particular for separating water vapor in gases, which could lead to damages in subsequent aggregates due to condensation.

Condensate separators are used in exhaust gas measuring systems to separate water from sample gas flows that contain exhaust gases with water or water vapor. Water vapor is produced during the combustion of fuels and is contained as a component in the exhaust gas flow, wherein the fluid is just saturated with water vapor at the dew point. If the temperature of the fluid is decreased below the dew point, the water vapor condenses so that the condensate is in the liquid phase. Such a condensation in the measuring device can, for example, cause incorrect results from spectroscopically working measuring devices and contaminate the aggregates of the exhaust gas measuring systems so that the life span of the measuring devices is reduced, for example, due to corrosion.

It is particularly important to prevent the condensation of water vapor in measuring devices that operate cold, i.e., below the dew point of the exhaust gas mixtures, since a condensation of the water vapor from the sample gas can in particular be expected in this case. Examples thereof include the measurement of the oxygen concentration via a paramagnetic detector which uses the magnetic characteristics of oxygen to determine the concentration of oxygen in a gas flow, or the spectroscopic measurement of carbon monoxide, carbon dioxide or hydrocarbons via the non-dispersive infrared sensor.

The reduction of the fluid temperature below the dew point is therefore specifically used to reduce the content of water vapor in the exhaust gas and to separate the condensate before the measuring device in order to dry the sample gas. For this purpose, the sample gas is led through a cooler into a condensate separator, where the condensate is separated from the fluid, and the separated condensate is then led into a condensate tank from which the condensate is discharged at intervals or continuously via a discharge valve.

DE 37 06 941 A1 describes a condensate separator that works with a cooler. The cooler comprises a tank filled with coolant. A spiral-shaped inlet line, through which the fluid to be cooled flows, runs through the tank filled with coolant and leads into a separation tank. The separation tank comprises a cylindrical section and a conical adjacent section, wherein the conical section is tapered downwards and leads into a condensate outflow opening. At the end of the condensate separator opposite to the condensate outflow opening, a plunger tube plunges into the condensate separator and is used a gas outlet nozzle and leads into a gas discharge line via which the dried gas can be supplied to subsequent aggregates. How the resulting condensate can be specifically discharged is not, however, described.

DE 10 2004 060 352 B3 describes an exhaust gas analyzer which comprises a measuring device, in front of which is arranged a condensate separator. The resulting condensate is discharged via a pump from the condensate separator by applying a negative pressure via the pump. This is usually performed with peristaltic pumps since peristaltic pumps operate without pulsation and with the downstream tanks being completely decoupled from the condensate separator. Repercussions, for example, from pressure surges, can thereby be avoided. This pump pumps the condensate into a condensate tank from which the condensate can be drained via a float valve. The gas entering the condensate tank can be discharged via a hose.

A disadvantage of this system is that a pump is used which can abrade and which must thus be maintained in order to convey the condensate and to avoid repercussions on the condensate separator or the measuring device, which can lead to a reduction of the separation efficiency or a degradation of the measurement results, particularly due to pressure surges when draining the condensate.

SUMMARY

An aspect of the present invention is to further develop a condensate discharge system for an exhaust gas measuring device to achieve a condensate separation without additional conveying means and by avoiding repercussions in the form of pressure deviations on the separator, and in particular on the measuring devices, for example, when emptying the condensate tank, which can lead to a deterioration of the separation efficiency or of the measurement.

In an embodiment, the present invention provides a condensate discharge system for an exhaust gas measuring device. The condensate discharge system includes a condensate separator in which a positive pressure prevails, an outflow line in which atmospheric pressure prevails, a connecting line, and an intermediate reservoir in which the positive pressure prevails. The intermediate reservoir is arranged between the condensate separator and the outflow line and is directly connected to the condensate separator via the connecting line. The intermediate reservoir comprises a float valve via which a condensate is dischargeable into the outflow line.

BRIEF DESCRIPTION OF THE DRAWING

The present invention is described in greater detail below on the basis of embodiments and of the drawing in which:

The FIGURE schematically shows an exemplary embodiment of a condensate discharge system for an exhaust gas measuring device according to the present invention.

DETAILED DESCRIPTION

Since a positive pressure prevails in the condensate separator and an intermediate reservoir, in which positive pressure also prevails, is arranged between the condensate separator and the outflow line and is directly connected via a connecting line to the condensate separator and comprises a float valve via which condensate can be discharged into the outflow line, the condensate tank is decoupled from the outflow line, whereby pressure surges on the outflow line cannot be transferred to the condensate separator and thus cannot be transferred the measuring devices. The condensate separator therefore operates at constant pressure ratios since the positive pressure area is separated from the atmospheric pressure area by the valve in the intermediate reservoir. Additional abrasive conveying means, via which a spatial separation between the outflow line and the condensate separator is created, are not required.

Due to the arrangement according to the present invention, it is also possible to make the condensate separator particularly small because no need for a valve in the condensate separator exists. This minimizes the existing dead volume at the condensate separator, which in turn significantly reduces the response time compared to known embodiments.

In an embodiment of the present invention, the intermediate reservoir can, for example, be filled in a lower volume with condensate, which condensate can then be discharged via a condensate outlet arranged at the lower volume, and is filled with a gas in an upper volume, which gas can be discharged via a gas outlet arranged at the upper volume. Gas entering the intermediate reservoir can thus be discharged from the intermediate reservoir so that only condensate enters the condensate tank via the condensate outlet.

In an embodiment of the present invention, the outflow line can, for example, lead into a condensate tank from whose lower area a discharge line leads away, in which a discharge valve is arranged, and at whose upper area a ventilation opening is formed. Atmospheric pressure can be maintained in this condensate tank due to the gas discharge opening so that pressure surges during emptying do not lead to repercussions on the intermediate reservoir. The condensate discharge system thus does not require a constant connection to a drainage, but can be emptied systematically at intervals.

In an embodiment of the present invention, the gas outlet of the intermediate reservoir can, for example, be connected to a flow resistance line, which can in particular be designed either as a capillary or as a nozzle. Gas entering the intermediate reservoir can thereby be discharged due to the applied pressure differential. Backflows are thereby avoided.

In an embodiment of the present invention, the capillary or the nozzle can, for example, be heated so that remaining water vapor cannot condense, via which the capillary or the nozzle would be contaminated. Deposits on the capillary are correspondingly avoided via the heating.

In an embodiment of the present invention, the feed pump can, for example, be arranged upstream of the condensate separator, whereby the entire condensate separator operates at a positive pressure. This prevents humidity from subsequently penetrating the gas streams due to occurring leaks. Additional conveying means are not required.

It is also advantageous if the condensate separator is a condensate separator cooled with coolant. Such a condensate separator has a very good efficiency in the separation of exhaust gas flows to be measured so that very good measurement results can be achieved.

In an embodiment of the present invention, the coolant is a solid heat sink cooled via a peltier cooler. This has proven to be an efficient cooling method since no fluid-carrying lines are required.

In an embodiment of the present invention, the condensate separator can, for example, comprise a housing in which is arranged a cooled inlet line for letting in a sample gas flow, an outlet opening for discharging a gas flow, and an outflow opening which leads into the connecting line between the condensate separator and the intermediate reservoir for discharging the condensate. The housing thus surrounds the cooling area as well as the separation area of the condensate separator.

The outlet opening of the condensate separator is additionally connected to a sample gas line that leads into an exhaust gas measuring device with an operating temperature between ambient temperature and 70° C. so that only dry sample gas is used for measurements with the measuring device. This improves measurement results and reduces the ageing of the measuring device caused by deposits resulting from condensation. These measuring devices are usually operated at a temperature slightly above ambient temperature in order to avoid a temperature drift.

It is also advantageous if the cooled inlet line is helically formed and tangentially leads into a separation chamber on whose lower side a funnel is formed that leads into the outflow opening for the condensate and on which upper side a gas outlet nozzle is formed that leads into the outlet opening. The cyclonic form of the condensate separator enables very good separation degrees, since the form and the thus directed discharge of the water prevent condensate droplets from being carried along in the direction of the gas outlet opening. Splash water, which could also lead to the water being carried along to the gas outlet opening, is also avoided. The condensate rather adheres to the surfaces and is guided by the decline of the separation chamber towards the outflow opening.

It is also advantageous if the condensate tank is arranged above the intermediate reservoir, via which the vertically required installation space is limited. This is made possible by operating at a positive pressure.

A condensate discharge system for an exhaust gas measuring device is thus provided with which very good measurement results can be achieved on the measuring device even at ambient temperature, since condensate is reliably discharged before the measuring device by providing a high separation efficiency and by reliably avoiding repercussions on the condensate separator. The system can thus be used continuously.

An exemplary embodiment of a condensate discharge system for an exhaust gas measuring device according to the present invention is schematically described via the FIGURE below.

The FIGURE shows a test bench where exhaust gas from a vehicle 10 is supplied through a sample gas line 12 via a feed pump 13 to an exhaust gas analyzer 14 which is arranged downstream of the feed pump 13. The exhaust gas analyzer 14 comprises a condensate discharge system 16 whose condensate separator 18 is arranged upstream of an exhaust gas measuring device 20, in particular of a non-dispersive infrared detector or a paramagnetic oxygen detector which is operated at operating temperatures between ambient temperature and approximately 70° C. so that, without using the upstream condensate separator 18, a risk would exist that the water vapor dissolved in the warm exhaust gas would condense out in the infrared detector or would result in an increased cross-sensitivity due to a higher water vapor concentration, which would falsify the measurement results.

The condensate separator 18 comprises a housing 22 surrounded by a spiral-shaped inlet line 24. The inlet line 24 is surrounded by a heat sink 29 that in particular consists of a good heat conducting material and which abuts extensively on the cool side of a peltier cooler 33 so that the fluid entering the inlet line 24 is cooled. The inlet line 24 tangentially leads into a separation chamber 26 whose cylindrical housing section 27 merges into a lower funnel 28 on whose lower end an outflow opening 30 for the separated condensate is formed and in which a positive pressure prevails due to the feed pressure of the feed pump 13. A gas outlet nozzle 32 protrudes centrally in the upper cylindrical housing section 27 through which the dried sample gas reaches an outlet opening 34 of the condensate separator 18 and is then supplied through a sample gas line 36 connected to the outlet opening to the exhaust gas measuring device 20 in which, for example, the concentration of carbon monoxide, carbon dioxide or hydrocarbons in the exhaust gas is measured.

The sample gas is thus cooled down in the inlet line 24 below the dew temperature, whereby a majority of the water vapor contained in the sample gas condenses. The condensate with the sample gas enters the separation chamber 26 tangentially due to the gas flow and gravity. The condensate first circulates along the wall surface of the cylindrical housing section 27 due to the tangential inflow. Due to the higher mass of the condensate droplets compared to the gas, a higher centrifugal force and gravity act on the condensate droplets so that the condensate drops carried along by the volume flow of the sample gas are released from the sample gas and reach an outflow opening 30 via a funnel 28, while the sample gas flow follows the pressure drop in the direction of the gas outlet nozzle 32. The funnel 28 prevents splash water which results from water dripping onto the surface of the condensate and which could be carried along by the gas flow. An inlet cross section of the gas outlet nozzle 32 can also selected to be greater than an outlet cross section so as to reduce the flow velocity at the inlet cross section and thus also the drag force of the gas flow.

The present invention provides that the condensate flows due to the prevailing positive pressure from the outflow opening 30 through a first connecting line 38 into an intermediate reservoir 40, in which a positive pressure also prevails due to the feed pressure of the feed pump 13. A float valve 42, which releases or closes a condensate outlet 44 of the intermediate reservoir 40 depending of the water level, is arranged in the intermediate reservoir 40. The float valve 42 comprises a float element 46 that floats on the water surface of the intermediate reservoir 40 and divides the intermediate reservoir 40 into an upper volume 48 filled with gas that has been discharged with the condensate from the condensate separator 18 through the outflow opening 30, and a lower volume 50 filled with the condensate.

A gas outlet 52 is formed at the upper volume 48 that leads into a heated capillary 54 with which the gas can be discharged that has previously entered the intermediate reservoir together with the condensate. A heating 55 is used to prevent water vapor or other compounds dissolved in the gas from further condensing, which would cause a deposit formation in the heated capillary 54 which could in turn result in a blockage.

The condensate outlet 44 of the intermediate reservoir 40 is connected via an outflow line 56 to a condensate tank 58 into which the condensate is discharged and in which atmospheric pressure prevails. A lower outflow line 59 in which a discharge valve 60 is arranged, via which the condensate from the exhaust gas analyzer 14 can be discharged, is connected to the condensate tank 58. The discharge valve 60 is actuated at regular intervals by the operating personnel in order to avoid the condensate tank 58 from being completely filled. An automatic or a continuous emptying thereof is also possible. A ventilation opening 61 which is also connected to the atmosphere is formed at the upper area via which a pressure compensation in the condensate tank 58 is achieved so that, in case the float valve 42 is open, no pressure can be build up in the condensate tank 58.

The structure of the condensate discharge system 16 and in particular the arrangement of the intermediate reservoir 40 makes it possible to empty the system by using discharge valves 60 between the condensate tank 58 and the condensate separator 18 while the measurement takes place, which means that sample gas is supplied to the condensate separator 18 and the exhaust gas measuring device 20, since no repercussions on the condensate separator 18 are expected. A transfer of otherwise possible pressure surges or pulsations on the condensate separator 18 when emptying the condensate tank 58 is entirely excluded by interposing the intermediate reservoir 40 and by the thus resulting decoupling of the condensate separator 18 from the outflow line 56 and by using the condensate tank 58 with the ventilation opening 61. The condensate and the gas flows are discharged by the feed pressure of the upstream feed pump 13. Subsequent peristaltic pumps or similar for conveying and at the same time separating the condensate separator 18 from the condensate tank 58 are not required, whereby the abrasion of the condensate discharge system 16 is reduced and maintenance intervals can be extended.

It should be clear that the scope of protection of the present invention is not limited to the described exemplary embodiment. It is in particular possible to modify the construction of the condensate separator and/or the intermediate reservoir of the condensate tank. Such a system can also be used for various measuring devices. Reference should also be had to the appended claims.

What is claimed is:

1. A condensate discharge system comprising:
   a condensate separator in which a positive pressure prevails;
   an outflow line in which atmospheric pressure prevails;
   a connecting line;
   an intermediate reservoir in which the positive pressure prevails, the intermediate reservoir being arranged between the condensate separator and the outflow line and being directly connected to the condensate separator via the connecting line, the intermediate reservoir comprising a float valve via which a condensate is dischargeable into the outflow line; and
   a feed pump arranged in a sample gas line upstream of the condensate separator,
   wherein,
   the condensate discharge system is provided for an exhaust gas measuring device.

2. The condensate discharge system as recited in claim 1, wherein,
   the intermediate reservoir further comprises a gas outlet which is arranged at an upper volume and a condensate outlet which is arranged at a lower volume,
   the intermediate reservoir is filled with the condensate in the lower volume,
   the intermediate reservoir is filled with a gas in the upper volume,
   the condensate is dischargeable via the condensate outlet at the lower volume, and
   the gas is dischargeable via the gas outlet at the upper volume.

3. The condensate discharge system as recited in claim 2, further comprising:
a flow resistance line,
wherein,
the gas outlet of the intermediate reservoir is connected to the flow resistance line.

4. The condensate discharge system as recited in claim 3, wherein, the flow resistance line is a capillary or a nozzle.

5. The condensate discharge system as recited in claim 4, wherein, the capillary or the nozzle is configured to be heated.

6. The condensate discharge system as recited in claim 1, further comprising:
a condensate tank comprising an upper area, a lower area, and a ventilation opening arranged in the upper area;
a discharge line arranged to lead away from the lower area of the condensate tank; and
a discharge valve arranged in the discharge line.

7. The condensate discharge system as recited in claim 6, wherein the condensate tank is arranged above the intermediate reservoir.

8. The condensate discharge system as recited in claim 1, wherein the condensate separator is configured to be cooled with a coolant.

9. The condensate discharge system as recited in claim 8, further comprising:
a peltier cooler,
wherein,
the coolant is a solid heat sink which is cooled via the peltier cooler.

10. The condensate discharge system as recited in claim 1, wherein the condensate separator comprises a housing in which is arranged a cooled inlet line, an outlet opening, and an outflow opening, the cooled inlet line being configured to admit a sample gas flow, the outlet opening being configured to discharge a gas flow, and the outflow opening being arranged to lead into the connecting line between the condensate separator and the intermediate reservoir for discharging the condensate.

11. The condensate discharge system as recited in claim 10, further comprising:
a sample gas line arranged to lead to the exhaust gas measuring device,
wherein,
the outlet opening of the housing of the condensate separator is connected to the sample gas line, and
the exhaust gas measuring device is configured to have an operating temperature between an ambient temperature and 70° C.

12. The condensate discharge system as recited in claim 10, further comprising:
a separation chamber comprising a funnel arranged at a lower side of the separation chamber and a gas outlet nozzle arranged at an upper side of the separation chamber, the funnel being arranged to lead into the outflow opening, and the gas outlet nozzle being arranged to lead into the outlet opening,
wherein,
the cooled inlet line is helically formed and is arranged to tangentially lead into the separation chamber.

13. A condensate discharge system comprising:
a condensate separator in which a positive pressure prevails;
an outflow line in which atmospheric pressure prevails;
a connecting line;
an intermediate reservoir in which the positive pressure prevails, the intermediate reservoir being arranged between the condensate separator and the outflow line and being directly connected to the condensate separator via the connecting line, the intermediate reservoir comprising a float valve via which a condensate is dischargeable into the outflow line; and
a feed pump arranged in a sample gas line upstream of the condensate separator,
wherein,
the condensate separator comprises a housing in which is arranged a cooled inlet line, an outlet opening, and an outflow opening, the cooled inlet line being configured to admit a sample gas flow, the outlet opening being configured to discharge a gas flow, and the outflow opening being arranged to lead into the connecting line between the condensate separator and the intermediate reservoir for discharging the condensate, and
the condensate discharge system is provided for an exhaust gas measuring device.

* * * * *